United States Patent Office 3,486,917
Patented Dec. 30, 1969

3,486,917
INSULATING CEMENT COMPOSITIONS
Charles Edward Wallis, Baden, near Vienna, Austria, assignor to Continental Capital-Control Centre Establishment, Schaan, Liechtenstein, a firm
No Drawing. Filed Dec. 16, 1965, Ser. No. 514,392
Int. Cl. C04b 7/02, 7/00
U.S. Cl. 106—90    6 Claims

ABSTRACT OF THE DISCLOSURE

A composition especially adapted for forming a waterproof insulation comprising cement, sand, an additive comprising a montmorillonite mineral, a filler having hydraulic properties, a setting regulator and a surface active agent.

---

In spite of the fact that in recent years a considerable advance in the quality of cement and the technology of concrete has been made and that a number of additives has been developed, the necessity for a subsequent insulation against water and moisture penetration remains.

Attempts have been made to repair leakages which repeatedly occur in dams, pressure pipelines, water reservoirs and similar constructions with cement based insulators. Known cement based insulating materials are however very critical in the application.

The object of the invention is to produce a perfect surface applied insulator and joint packing which have the properties of being easy to apply, safe, non-ageing and cheap.

The invention relates to an additive for cement based mixtures, preferably used for insulation purposes. According to the invention it contains as a 40% additive to a mixture of cement and sand, the sand preferably arenaceous quartz, having an approximate granular size distribution of

| 0.0–0.1 | 0.1–0.3 | 0.3–0.6 | 0.6–0.8 mm. |
|---------|---------|---------|-------------|
| 20      | 40      | 30      | 10 = 100%   | a montmorillonite mineral, specially bentonite, a filler with hydraulic properties, preferably flue ash, surface active agents and setting regulators.

According to the invention the additive preferably contains as montmorillonite mineral an activated alkali bentonite having a moisture expansion value of up to 1000%. The content of the bentonite should be 10–50 weight percent, preferably 10–30%, specially approximately 10–15%. The bentonite can however, at least partly, be substituted by an organic bentonite such as acetyl bentonite. According to the invention the bentonites have strong intercrystal moisture expansion properties. This applies especially to the alkali activated bentonites. These have a reversible moisture expansion value of up to 1200%. According to the invention those bentonites with a moisture expansion value of approximately 1000% are preferred for the additive. By virtue of the moisture expansion properties of bentonit, the function of water in the cement mixture can be controlled, in as much as the surplus water is absorbed and then released to the cement during the setting procedure. In addition, the bentonites have thixotropic properties which are essential for the case of application.

It is recommended that the flue ash should be in a proportion of 20–80 weight percent, preferably 40–70, specially 60–70 weight percent, whereby the weight is that of the additive. The quantity of flue ash should be at least equal to that of the bentonite or upto the tenfold. The preferred ratio lies between 5:1 and 7:1. One can however partly substitute the flue ash with fine ground natural puzzolane, trass or similar. The effect of the flue ash or the puzzolane etc., can be briefly discribed as the effect of a filler with hydraulic properties. The flue ash has, in the initial stages, the effect of being a filler and has only in the later stages of the setting procedure, the property of acting as a strength improvement factor. In this case it is important that the granular size corresponds to that of the bentonite as well as of the sand and cement. Alkaline compounds and/or organic hydroxy acids or if necessary, salts of hydrofluoric acid can be added to control the setting procedure. Calcined soda is preferred as an alkali, which at the same time binds the free lime in the form of calcium carbonate. One can however, to advantage, to some extent substitute the soda by other lime binding alkaline compounds such as trisodiumphosphate. The ratio of substituted soda through trisodiumphosphate should be from 5:1 to 1:3, preferred however is between 2:1 and 1:2. In general one can substitute 4 parts of soda with 1 part of trisodiumphosphate. As organic hydroxy acid, tartaric acid has proved to be most suitable. Optical eletronic tests have shown that it controls the setting procedure by stimulating the creation of crystal nuclei.

According to the invention the quantity of tartaric acid, contained in the additive, should be 2–10 weight percent, preferably 4–7 weight percent. The quantity of tartaric acid should however be approx. 5–25 weight percent, preferably approx. 10–15 weight percent of the sum of the activated bentonite and alkali. The mentioned proportions of the quantities of alkali, bentonite and tartaric acid are essential for obtaining optimum results. The effect of the alkali, especially soda, is to cause an acceleration of the setting procedure, which must be, by virtue of the tartaric acid in conjunction with the activated alkali bentonite, passed over into a gradual subsequent hardening with a loss of strength. Especially the bentonite has, at this first stage, the quality of being a water acceptor and in the second stage of being a water donator. As surface active agents such as aliphatic or aromatic sulphonates, sulphonates of fatty alcohols, or nonionic compounds f.i. adducts of polyalkylene oxides can be used. The quantity of surface active substances needed is very little. It is no more than 0.5% of the mixture or 3% of the quantity of soda. The effect of the surface active agent can be described as follows: A water filled capillary system is absolutely necessary in order to make it possible for chemicals to penetrate the construction in depth. A clogging up of the surface is thereby substituted by an insulation of the construction in depth.

According to the invention one proceeds in the production of the additive to at first making a mixture consisting of the appropriate quantities of tartaric acid, alkali and the organic surface active substance. These fine chemicals are ground in a cross beater mill fitted with a sieve, to a grain size of approx. 8–10/$\mu$. One after the other the bentonite, the above mentioned mixture of fine chemicals and at last the flue ash, are then mixed in a counter flow mixer.

The invention is described in more detail by the following examples:

EXAMPLE 1

As described above, the first mixture is made up of 0.2 kg. of a trade surface active agent, 13.0 kg. calcinated soda and 3.8 kg. tartaric acid. This is then mixed with 13 kg. alkali activated bentonite with a moisture expansion values of approx. 1000% and 30 kg. flue ash. The flue ash should, if possible, have an $SO_3$ content of under 3%. After mixing, a product is obtained which, mixed with 460 kg. cement and 480 kg. sand, gives an excellent insulating material. In order to achieve optimum results the following grain distribution of the sand which is preferably an arenaceous quartz is necessary:

| 0.0–0.1 | 0.1–0.3 | 0.3–0.6 | 0.6–0.8 mm. |
|---------|---------|---------|-------------|
| 20 | 40 | 30 | 10 = 100% |

The resulting cement mixture is then mixed with water (approx. 25% of the weight of the mixture) and produces a thick slurry which is specially suitable for filling joints or as a surface coating agent against water pressure.

EXAMPLE 2

One proceeds as in Example 1, however a first mixture of 0.5 kg. surface active agent, 20.0 kg. soda and 6.5 kg. tartaric acid is prepared and mixed with 20 kg. of the activated bentonite and 100 kg. flue ash. The resulting product, mixed with 420 kg. cement and 433 kg. sand as described in Example 1, and water equalling ¼ of the total weight, is an insulation material against moisture whether on concrete, natural stone, brickwork or mixed masonry as well as a masonry adhesive.

EXAMPLE 3

As in Example 1, a mixture is made up of 0.8 kg. surface active agent, 49 kg. calcinated soda, 21.1 kg. tartaric acid, 150 kg. activated bentonite and 150 kg. flue ash. The product is mixed as described in Example 1, with 400 kg. cement and 229 kg. sand, the half of its weight in water is added and a thin slurry is resulting, which is excellent as a horizontal insulation for aged buildings.

I claim:

1. A composition especially adapted for forming a waterproof insulation consisting essentially, per 1000 kg., of:
    (a) approximately 460 kg. cement;
    (b) approximately 480 kg. sand having a granular size distribution of about

| 0.0–0.1 | 0.1–0.3 | 0.3–0.6 | 0.6–0.8 mm. |
    |---------|---------|---------|-------------|
    | 20 | 40 | 30 | 10 = 100% |

(c) approximately 13 kg. activated bentonite;
    (d) approximately 30 kg. flue ash;
    (e) approximately 13 kg. calcined soda;
    (f) approximately 3.8 kg. tartaric acid; and
    (g) approximately 0.2 kg. surface active agent.

2. The composition of claim 1 wherein said sand is arenaceous quartz, said bentonite has a moisture expansion value of approximately 1000% and said flue ash has an $SO_3$ content of under 3%.

3. A composition especially adapted for forming a waterproof insulation consisting essentially, per 1000 kg., of:
    (a) approximately 420 kg. cement;
    (b) approximately 433 kg. sand having a granular size distribution of about

| 0.0–0.1 | 0.1–0.3 | 0.3–0.6 | 0.6–0.8 mm. |
    |---------|---------|---------|-------------|
    | 20 | 40 | 30 | 10 = 100% |

(c) approximately 20 kg. activated bentonite;
    (d) approximately 100 kg. flue ash;
    (e) approximately 20 kg. calcined soda;
    (f) approximately 6.5 kg. tartaric acid; and
    (g) approximately 0.5 kg. surface active agent.

4. The composition of claim 3 wherein said sand is arenaceous quartz, said bentonite has a moisture expansion value of approximately 1000% and said flue ash has an $SO_3$ content of under 3%.

5. A composition especially adapted for forming a waterproof insulation consisting essentially, per 1000 kg., of:
    (a) approximately 400 kg. cement;
    (b) approximately 229 kg. sand having a granular size distribution of about

| 0.0–0.1 | 0.1–0.3 | 0.3–0.6 | 0.6–0.8 mm. |
    |---------|---------|---------|-------------|
    | 20 | 40 | 30 | 10 = 100% |

(c) approximately 150 kg. activated bentonite;
    (d) approximately 150 kg. flue ash;
    (e) approximately 49 kg. calcined soda;
    (f) approximately 21.1 kg. tartaric acid; and
    (g) approximately 0.8 kg. surface active agent.

6. The composition of claim 5 wherein said sand is arenaceous quartz, said bentonite has a moisture expansion value of approximately 1000% and said flue ash has an $SO_3$ content of under 3%.

References Cited

UNITED STATES PATENTS

| RE. 17,207 | 2/1929 | Collings | 160—97 |
| 2,174,051 | 9/1939 | Winkler | 106—27 |
| 2,516,342 | 7/1950 | Randall | 106—92 |
| 2,522,707 | 9/1950 | Faber et al. | 106—76 |

OTHER REFERENCES

The Chemistry of Cement and Concrete, Edward Arnold (Publishers) Ltd., London, 2nd ed. (1956), pp. 510 and 517.

TOBIAS E. LEVOW, Primary Examiner

A. P. DEMERS, Assistant Examiner